United States Patent [19]
Flegel

[11] Patent Number: 6,107,701
[45] Date of Patent: *Aug. 22, 2000

[54] OPTIONAL METER PANEL FOR A TRANSFER SWITCH HAVING A TERMINAL COMPARTMENT

[75] Inventor: David D. Flegel, Racine, Wis.

[73] Assignee: Reliance Controls Corporation, Racine, Wis.

[ * ] Notice: This patent is subject to a terminal disclaimer.

[21] Appl. No.: 09/139,154

[22] Filed: Aug. 24, 1998

[51] Int. Cl.[7] .................................................. H01H 47/00
[52] U.S. Cl. ........................................... 307/125; 307/149
[58] Field of Search ..................................... 307/125, 149, 307/153; 439/536, 535; 361/643, 644, 657, 667, 641, 661, 664, 668

[56] References Cited

U.S. PATENT DOCUMENTS

| | | |
|---|---|---|
| 2,577,974 | 12/1951 | McKinley . |
| 2,603,546 | 7/1952 | Lais . |
| 3,277,251 | 10/1966 | Daly .......................................... 200/50 |
| 3,284,591 | 11/1966 | Daly .......................................... 200/50 |
| 3,315,556 | 4/1967 | Speck . |
| 3,353,068 | 11/1967 | Turk . |
| 3,361,938 | 1/1968 | Watson ..................................... 317/120 |
| 3,391,374 | 7/1968 | Schleicher ................................. 339/14 |
| 3,523,166 | 8/1970 | Daly .......................................... 200/50 |
| 3,559,148 | 1/1971 | Hafer ......................................... 339/22 |
| 3,636,237 | 1/1972 | Hafer ......................................... 174/68 |
| 3,654,484 | 4/1972 | Jorgenson et al. ....................... 307/149 |
| 3,716,683 | 2/1973 | Hafer ......................................... 200/50 |
| 3,723,942 | 3/1973 | Dennison .................................. 339/14 |
| 3,731,256 | 5/1973 | Hafer ......................................... 339/22 |
| 3,739,321 | 6/1973 | Murphy et al. .......................... 339/103 |
| 3,742,431 | 6/1973 | Kobyner .................................. 339/272 |
| 3,781,765 | 12/1973 | Schleicher ............................... 339/103 |
| 3,895,179 | 7/1975 | Wyatt . |
| 3,922,053 | 11/1975 | Hafer ......................................... 339/22 |
| 3,949,277 | 4/1976 | Yosset ...................................... 317/120 |
| 4,067,529 | 1/1978 | Milcoy ..................................... 248/221 |
| 4,088,829 | 5/1978 | Milcoy ..................................... 174/53 |
| 4,390,926 | 6/1983 | Hart . |
| 4,899,217 | 2/1990 | MacFadyen et al. ..................... 358/86 |
| 5,070,252 | 12/1991 | Castenschiold et al. ................. 307/64 |
| 5,233,511 | 8/1993 | Bilas et al. .............................. 364/146 |
| 5,239,129 | 8/1993 | Ehrenfels . |
| 5,268,850 | 12/1993 | Skoglund ................................ 364/480 |
| 5,301,086 | 4/1994 | Harris et al. . |
| 5,568,362 | 10/1996 | Hansson ................................. 361/736 |
| 5,761,027 | 6/1998 | Flegel ..................................... 361/664 |
| 5,784,249 | 7/1998 | Pouliot ................................... 361/622 |
| 5,870,276 | 2/1999 | Leach et al. . |

OTHER PUBLICATIONS

Gentran Catalog, GT1094C, Reliance Time Controls, Inc., 1820 Layard Avenue, Racine, WI 53404, undated.

*Primary Examiner*—Fritz Fleming
*Attorney, Agent, or Firm*—Andrus, Sceales, Starke & Sawall

[57] ABSTRACT

A power transfer device adapted for interconnection with the electrical system of a building includes a cabinet, a set of switches mounted to the cabinet, and a first set of wires for connecting the switches to an electrical distribution panel associated with the building electrical system. The power transfer device includes a terminal compartment associated with the cabinet, a set of power input terminals located within the terminal compartment, and a cover removably connected to the cabinet for alternatively preventing and permitting access to the terminal compartment. The cover is provided with an optional meter arrangement adapted to be interconnected with the power input terminals for selectively measuring levels of power provided from a source of auxiliary power connected to the power input terminals.

23 Claims, 3 Drawing Sheets

OPTIONAL METER PANEL FOR A TRANSFER SWITCH HAVING A TERMINAL COMPARTMENT

BACKGROUND AND SUMMARY OF THE INVENTION

This invention relates to a power inlet arrangement for providing power to the electric system of a building, such as power supplied by a standby generator.

Portable generators may be used in certain situations to feed electrical power to residential and commercial load circuits during a utility power outage. These systems frequently include a power inlet box adapted for interconnection with the generator. The power inlet box is typically mounted to the exterior of a building. The power inlet box is connected to a transfer switching mechanism which continues the electrical path through circuit breakers associated with the transfer switching mechanism, to supply power to certain selected circuits of the load center as determined by the transfer switching mechanism circuit breakers. The circuits of the transfer switching mechanism are wired to selected circuits of the load center, through wiring housed within a conduit extending between the load center and the transfer switching mechanism.

The present invention relates to a power transfer arrangement such as is disclosed in co-pending U.S. patent application Ser. No. 09/021,670, filed Feb. 10, 1998, the disclosure of which is hereby incorporated by reference. In that application, a power transfer switching mechanism for interposition between a remote power inlet box and the electrical load center of a building includes a terminal compartment for receiving power input wires connected to the remote power inlet box. The switching mechanism includes a cabinet defining an internal cavity within which a series of switches are mounted. The cabinet further defines a terminal compartment, and a terminal assembly is disposed within the terminal compartment. The terminal compartment is accessible through an opening associated with the cabinet, and a cover is selectively positionable over the opening to provide or prevent access to the terminal compartment. A series of wires are interconnected between the terminal assembly and the switches, and power input wiring is received within the terminal compartment and interconnected with the remote power inlet box. The ends of the power input wires are engageable with the terminal assembly for establishing a direct electrical connection between the remote power inlet box and the switches of the switching mechanism.

The present invention also relates to a power transfer switching mechanism such as is disclosed in co-pending U.S. patent application Ser. No. 09/062,257, filed Apr. 17, 1998, the disclosure of which is hereby incorporated by reference. The '257 application improves upon the '670 application by disclosing a power input terminal arrangement in the power transfer switching mechanism in combination with a removable cover for preventing access to the power input terminal arrangement. The cover is provided with a power input structure, such as a socket or receptacle, connected to the terminal assembly for selectively receiving a plug connector electrically interconnected with a source of auxiliary power such as a generator. The power transfer switching mechanism in the '257 application provides a selective rather than a direct, hardwired electrical connection between the remote power inlet box and the switches of the switching mechanism.

While the above-described transfer switching mechanisms provide extremely convenient and simple arrangements for establishing direct, hardwired and selective connections with the power inlet box, it is sometimes desirable to provide a power transfer switching mechanism having a power input meter arrangement in its front panel. With this modification, it is possible to monitor the amount of power provided by a generator during a power outage, so as to prevent overloading of and subsequent damage to the generator or to the building electrical system. Although the broad concept of integrally providing power input meters on a power transfer switching mechanism is well known, it is desirable to modify the power transfer switching mechanisms described in the aforementioned co-pending patent applications to provide an optional meter arrangement in a cover which is selectively engageable with the cabinet of the switching mechanism.

It is an object of the present invention to provide a transfer switching mechanism having a removable access cover provided with a power input meter arrangement for measuring input power to the transfer switching mechanism from a generator or from a power inlet connected with the generator. It is a further object of the present invention to provide such a transfer switching mechanism which ensures that a reliable selective connection is established with the generator when power is supplied to a transfer switching mechanism. Another object of the present invention is to provide a transfer switching mechanism which is simple to install and which operates generally similarly to prior art transfer switching mechanisms. It is also an object of the present invention to provide a method for constructing a power transfer device having interchangeable access covers, one of which functions as an optional meter panel for monitoring power supplied by a generator so as to prevent overloading thereof.

The invention contemplates an improvement in a power transfer arrangement for supplying power from a generator to the electrical system of a building. The power transfer arrangement includes a power inlet arrangement for interconnection with the generator for receiving power therefrom, and a power transfer device separate from the power inlet arrangement adapted for interconnection with the building electrical system. The invention resides in a power input terminal arrangement in the power transfer device in combination with a removable cover associated with the power transfer device for selectively preventing access to the power input terminal arrangement. The cover is provided with a power input indicating structure connected to the power input terminal arrangement for selectively displaying the amount of power provided by the generator. The power transfer device includes a cabinet having a front panel to which is mounted a set of switches for controlling the supply of power from the power transfer device to the building electrical system, and the set of switches are electrically connected to the power input terminal arrangement. The power transfer device further includes a set of power input terminals for establishing a direct electrical connection between the power inlet arrangement and the power transfer device. The power input terminals are located within a power input terminal compartment defined by the cabinet at a location spaced from the set of switches. The cabinet defines an opening providing access to the power input terminal compartment. The cover is positionable over the opening and removably engageable with the cabinet for selectively closing the opening for preventing access to the power input terminal compartment. The opening providing access to the power input terminal compartment is defined in part by a rearwardly extending edge of the front panel. The cover has a rearwardly extending ledge engageable with the rearwardly extending edge of the front panel, and a vertically extending wall depending from the edge and engageable with an end wall of the cabinet. The ledge is recessed to accommodate the power input terminals when the cover is in position covering the opening. The power input indicating structure is fixed to the vertically extending wall of the cover. The power input indicating structure includes at least one meter have a block-like rear portion and convexly-shaped forward portion projecting through the vertically extending wall of the cover. The forward portion includes a transparent window having a support member for mounting a wattage scale visible through the window, and an indicator mounted for movement along the scale in response to the supplying of power from the generator.

In the preferred embodiment, the power input indicating structure includes a pair of spaced apart meters. Each of the meters is fixed to the vertically extending wall of the cover by a spring-biased clip. The power transfer device also includes a set of power input wires extending between the power input indicating structure and the power input terminals. The power indicating structure includes a U-shaped attachment bracket positioned on the vertically extending wall of the cover for facilitating connection of the meters to the power input terminals. The attachment bracket includes a flat base plate and a pair of parallel side plates extending rearwardly from the base plate. An H-shaped terminal connector is fixed to the base plate and a pair of wire-guiding holders are fixed in the side plates.

The invention further contemplates an improvement in a power transfer device adapted for interconnection with the electrical system of a building and including a cabinet, a set of switches mounted to the cabinet, and a first set of wires connecting the switches to an electrical distribution panel associated with the building electrical system. The invention is in the form of a terminal compartment associated with the cabinet, a set of power input terminals located within the terminal compartment, and a cover removably connected to the cabinet for alternately preventing and permitting access to the terminal compartment. The cover is provided with a meter arrangement interconnected with the power input terminals and adapted to selectively measure levels of power provided from a source of auxiliary power connected to the power input terminals. A set of power input wires enables connection of the meter arrangement with the power input terminals. The power input terminals are connected to the switches by a second set of wires. The cabinet includes a set of tabs spaced along an end wall thereof, the tabs having apertures formed therein. The cover includes a set of openings alignable with the apertures in the tabs. A set of fasteners is passed through the openings in the cover and is threadably engageable with the apertures in the tab.

The invention also relates to a method for constructing a power transfer device for supplying power to the electrical system of a building from a generator in electrical communication with a separate power inlet arrangement. The method includes the step of providing a cabinet having a power terminal arrangement; equipping the cabinet with a panel including a plurality of switches electrically connected to the power input terminal arrangement for controlling the supply of power from the power transfer device to the building electrical system; providing a first cover member adapted for removable engagement with the cabinet over the compartment for selectively enclosing the power input terminal arrangement; providing a second cover member having a power input meter arrangement and adapted for removable engagement with the cabinet over the compartment for selectively enclosing the power input terminal arrangement; and mounting either the first cover member or the second cover member to the cabinet over the compartment. The step of mounting the second cover member includes interconnecting the power input meter arrangement with the power input terminal arrangement.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
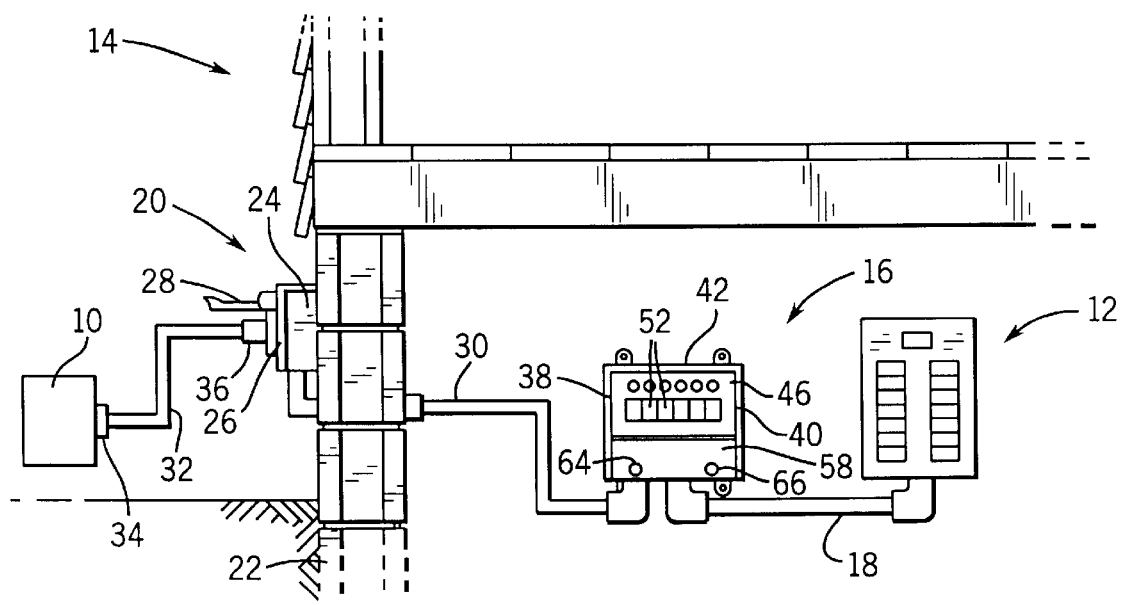
FIG. 1 is a schematic representation showing the power transfer arrangement constructed according to the invention for interposition between a remote power inlet arrangement fed by a portable power generator and an electrical panel associated with a building.

FIG. 1 shows a power inlet arrangement, as disclosed in the co-pending patent applications, for interconnecting a portable generator 10 with a main electrical panel or load center 12 located in the interior of a building 14. In the power inlet arrangement of FIG. 1, a manual power transfer switching mechanism 16 constructed in accordance with the invention is mounted adjacent main panel 12 and is interconnected therewith via a series of wires enclosed by a conduit 18 extending between main panel 12 and switching mechanism 16.

A power inlet box 20 is mounted to the wall of building 14, as shown at 22. Power inlet box 20 includes an external housing including a series of walls such as 24, and a recessed power inlet 26 mounted to a front wall of the housing. A cover 28 is mounted to the front wall of the housing via a hinge structure and is movable between an open position, as shown in FIG. 1 and a closed position in which cover 28 encloses recessed power inlet 26 when not in use. A conduit 30 extends between inlet box 20 and switching mechanism 16 and provides a direct electrical connection therebetween. Appropriate wiring and connections are contained within inlet box 20 and conduit 30 for providing an electrical path between inlet box 20 and switching mechanism 16.

A power cord 32 extends between generator 10 and power inlet box 20. Cord 32 includes a plug 34 at one end, which is engageable with the power outlet of generator 10. Cord 32 further includes a connector 36 at the end opposite plug 34. Connector 36 is engageable with recessed power inlet 26 for transferring power generated by generator 10 to power inlet box 20, which is then supplied through the wiring in conduit 30 to switching mechanism 16, and from switching mechanism 16 through the wiring in conduit 18 to main panel 12. In this manner, generator 10 functions to provide power to selected circuits of main panel 12 during a power outage. In this arrangement, the user first connects cord 32 between generator 10 and power inlet 20, and then commences operation of generator 10.

Figure 3:
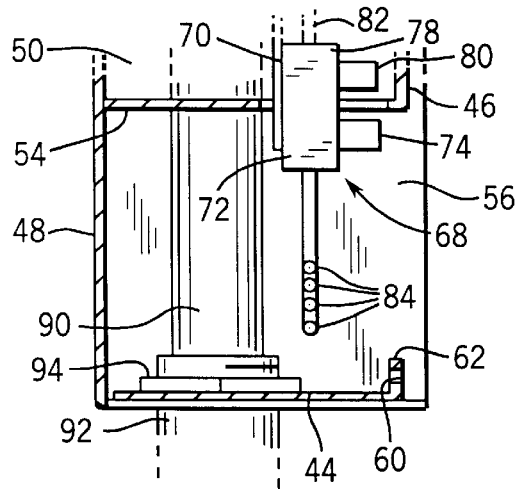
FIG. 3 is a partial, sectional view taken on line 3—3 of FIG. 2.
Figure 6:
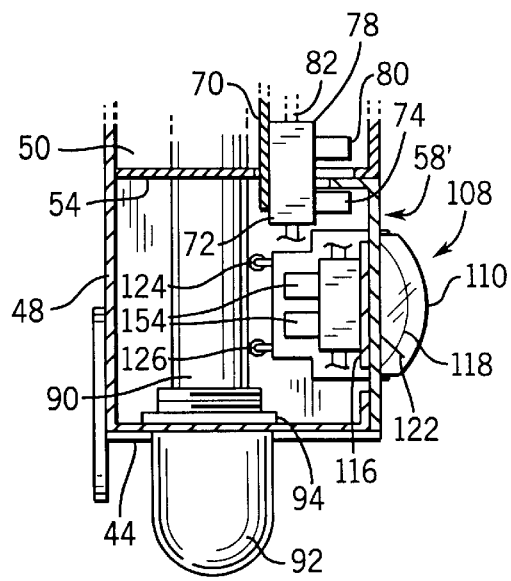
FIG. 6 is a partial, sectional view taken on line 6—6 of FIG. 4.
Figure 4:
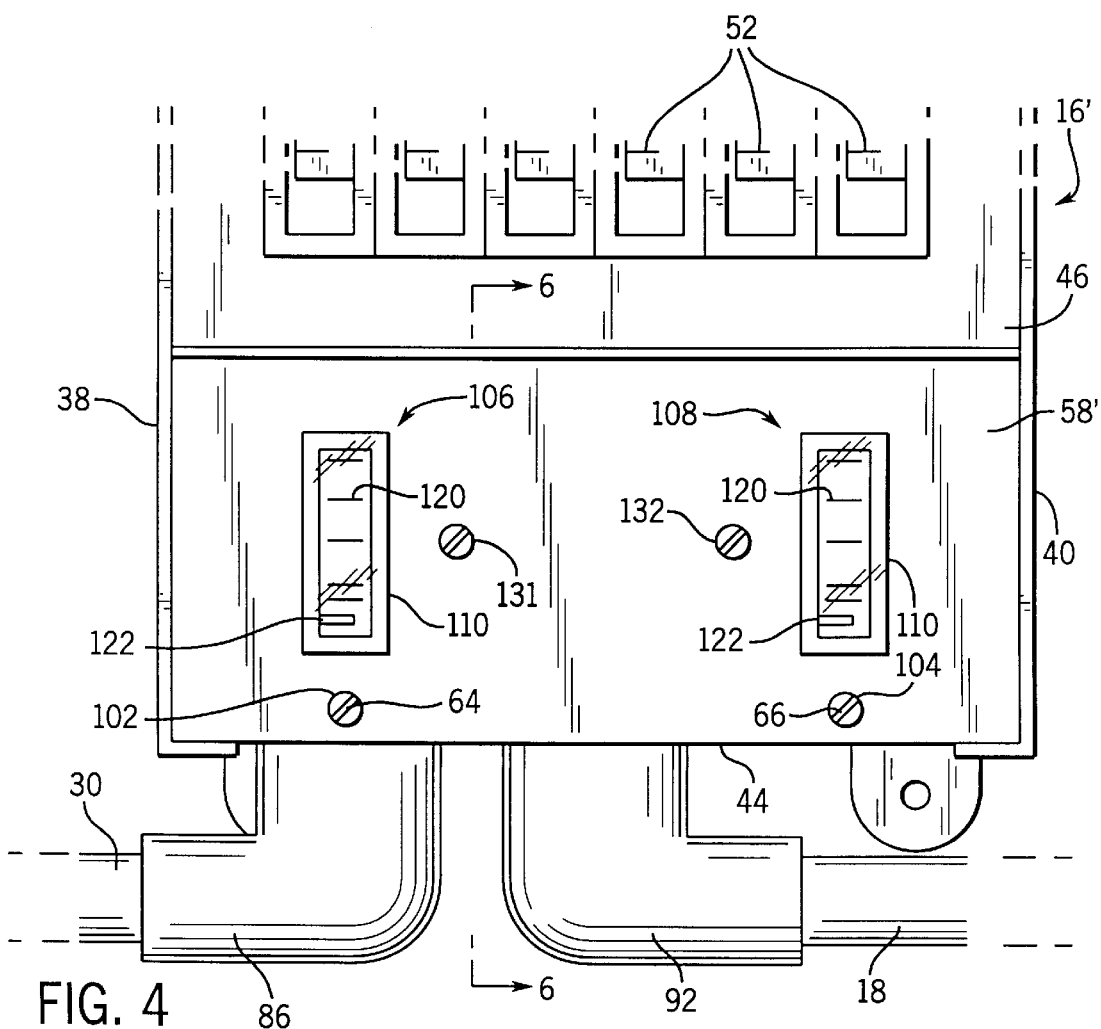
FIG. 4 is a partial, front elevational view showing the bottom portion of an alternative power transfer arrangement in which the access cover is provided with an optional meter arrangement and is shown in an installed condition.

Switching mechanism 16 is interposed between load center 12 and inlet box 20. Switching mechanism 16 includes a cabinet defining a pair of side walls 38,40, a top wall 42 extending between the upper ends of side walls 38 and 40, a bottom wall 44 extending between and interconnecting the lower ends of side walls 38 and 40, a partial height front panel 46 and a rear panel 48 (FIG. 3). Walls 38–44, in combination with front panel 46 and rear panel 48 define an upper cavity 50 within which a series of circuit breakers or switches 52 are located. Front panel 46 is bent rearwardly at its lower end to form an intermediate transverse wall 54 which defines the lower extent of upper cavity 50. A terminal compartment 56 is defined by an intermediate transverse wall 54 in combination with bottom wall 44, the lower portions of side walls 38 and 40 and the lower portion of rear panel 48. Terminal compartment 56 is accessible through an opening below front panel 46. A cover 58 (FIG. 1) is sized so as to close the opening of terminal compartment 56. Cover 58 includes a pair of openings in alignment with openings 60 formed in a pair of tabs 62 mounted to bottom wall 44, to enable cover 58 to be mounted to bottom wall 44 utilizing threaded fasteners 64,66 (FIG. 1) which extend through the openings in cover 58 and into engagement with the openings 60 in tabs 62. In this manner, cover 58 is selectively engaged with bottom wall 44 to provide access to terminal compartment 56, and is connected to bottom wall 44 so as to prevent access to terminal compartment 56.

Figure 2:
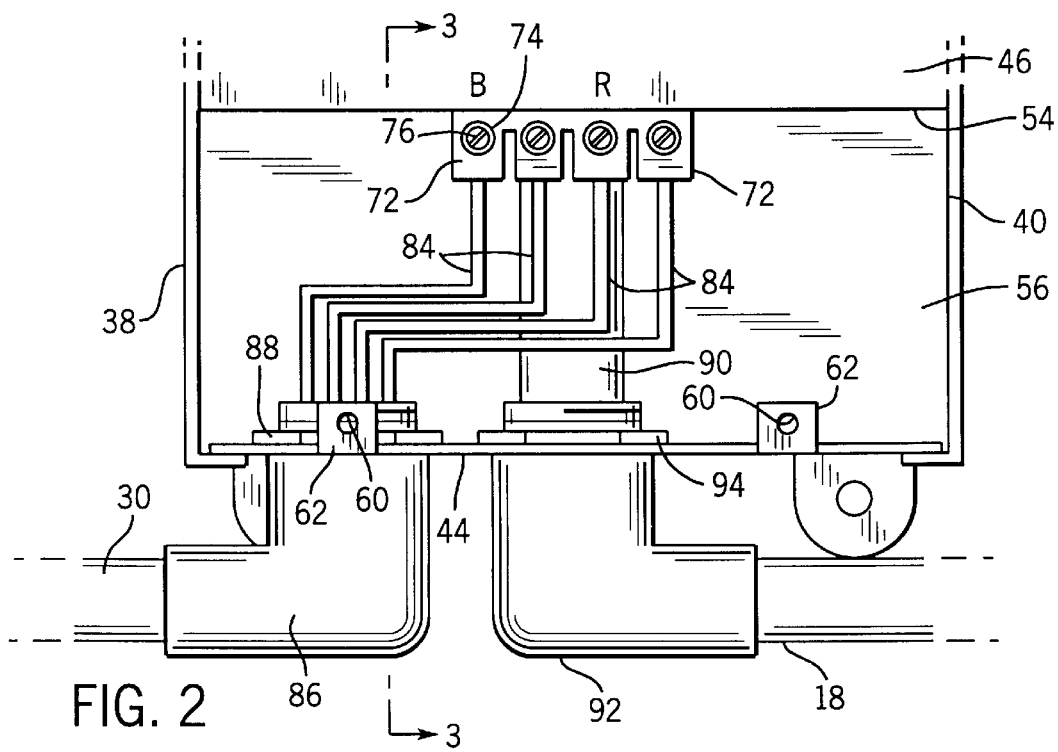
FIG. 2 is a partial, front elevational view showing the bottom portion of the power transfer arrangement of FIG. 1 with the access cover removed.

A terminal assembly 68 is mounted to a terminal plate 70, which is mounted at its ends to intermediate transverse wall 54 to fix terminal assembly 68 in position relative to intermediate transverse wall 54. Terminal assembly 68 is of conventional construction, including a series of cylindrical receivers 72, each of which defines a downwardly facing opening. Each receiver 72 includes an outwardly extending cylindrical member 74 extending perpendicularly to receiver 72, defining a passage for receiving a threaded member, the head of which is shown at 76 (FIG. 2). Receivers 72 are accessible from and in communication with terminal compartment 56. Terminal assembly 68 further includes a series of upwardly opening cylindrical receivers 78, which are disposed within upper cavity 50. Each upper cylindrical receiver 78 includes a cylindrical member 80 which receives a threaded member (not shown).

Terminal assembly 68 may illustratively be a terminal assembly such as is available from Atech Corp. of Somerville, N.J., under its Model No. TSF/16, although it is understood that any other satisfactory terminal arrangement could be employed. In a terminal arrangement such as this, receivers 72 and 78 are formed of a molded plastic material integrally with cylindrical member 74 and cylindrical member 80. These components surround metal contact assemblies with one of the contact assemblies being located in both a cylindrical receiver 72 and a cylindrical receiver 78. In this manner, an electrical connection to terminal assembly 68 is made by inserting a bare wire into the open lower end of receiver 72 and tightening the threaded member utilizing its head 76, to establish an electrical connection with the wire via the metal contact enclosed within cylindrical receiver 72. A similar operation is employed to connect the wire end to the contact enclosed by the opposed cylindrical receiver 78 so as to establish a connection between the wires connected to the terminal assembly in this manner.

As shown in FIG. 3, a wire such as 82 is connected to each upper cylindrical receiver 78 at one end. Two of wires 82 feed bus bars (not shown), which in turn are interconnected with switches 52 to provide power to switches 52. A third one of wires 82 is a neutral wire which is connected to the neutral of load center 12 and a fourth one of wires 82 is a ground wire attached to the frame of transfer switching mechanism 16.

Referring to FIGS. 1 and 2, conduit 30 extends between the power inlet box 20 and switching mechanism 16. Conduit 30 encloses a series of power input wires 84 (FIG. 2), and extends through a knock-out opening formed in the bottom wall 44 via a conventional conduit fitting 86 and lock nut 88. As can be appreciated, an input wire conduit could also be connected through a knock-out in either side wall 38 or 40, or in a knock-out opening in the lower portion of rear panel 48.

The ends of power input wires 84 are connected to terminal assembly 68 by placing the bare end of each wire 84 into one of the receivers 72 and tightening the associated threaded member, as explained previously, to establish an electrical connection with a contact member enclosed by one of the cylindrical receivers 72. In this manner, input power is supplied from remote power inlet 20 to terminal assembly 68, which is subsequently transferred from terminal assembly 68 to wires 82 and thereby to switches 52, as explained previously. This arrangement enables a person in installing switching mechanism 16, such as an electrician or do-it-yourself homeowner, to establish a direct electrical connection between remote power inlet box 20 and switching mechanism 16 without the need for connecting a flexible cord to a power input receptacle, as in the prior art. In this manner, after generator power cord 32 is plugged into remote power inlet box 20, the only necessary operation in connection with switching mechanism 16 to enable transfer of power from generator 10 to load center 12 is to place switches 52 in the appropriate position so as to transfer power to load center 12 as desired in response to operation of the generator 10.

Output wires from switches 52, shown at 90, extend through terminal compartment 56 to a conduit fitting 92 secured to bottom wall 44 by lock nut 94 for routing the wires through conduit 18 to load center 12. Other wires extend through terminal compartment 56, such as neutral and ground wires, as well as input wires from load center 12.

It can thus be appreciated that the provision of terminal compartment 56 provides an extremely convenient and simple arrangement for establishing a direct, hardwired connection between power inlet box 20 and power transfer switching mechanism 16. The user or installer simply must remove cover 58 to gain access to terminal compartment 56 for connecting or disengaging power input wires 84 to or from terminal assembly 68. Terminal compartment 56 also provides a convenient cavity to provide pulling of wires through conduit 30. Once the user has completed the necessary operations at terminal compartment 56, the user simply replaces cover 58, as described previously, to thereby prevent access to terminal compartment 56.

Figure 5:
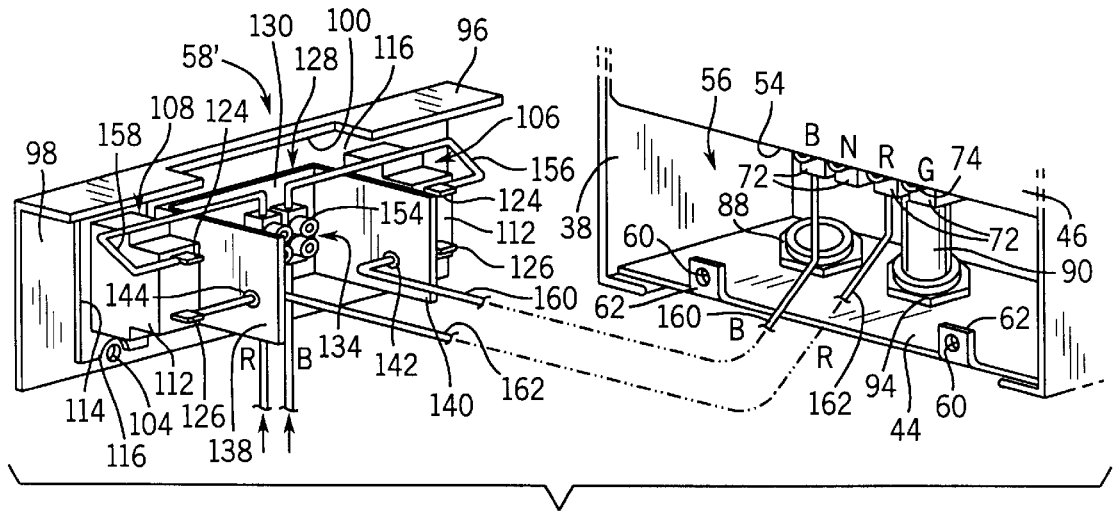
FIG. 5 is an exploded view of the access cover and bottom portions of the alternative power transfer arrangement shown in FIG. 4.
Figure 7:
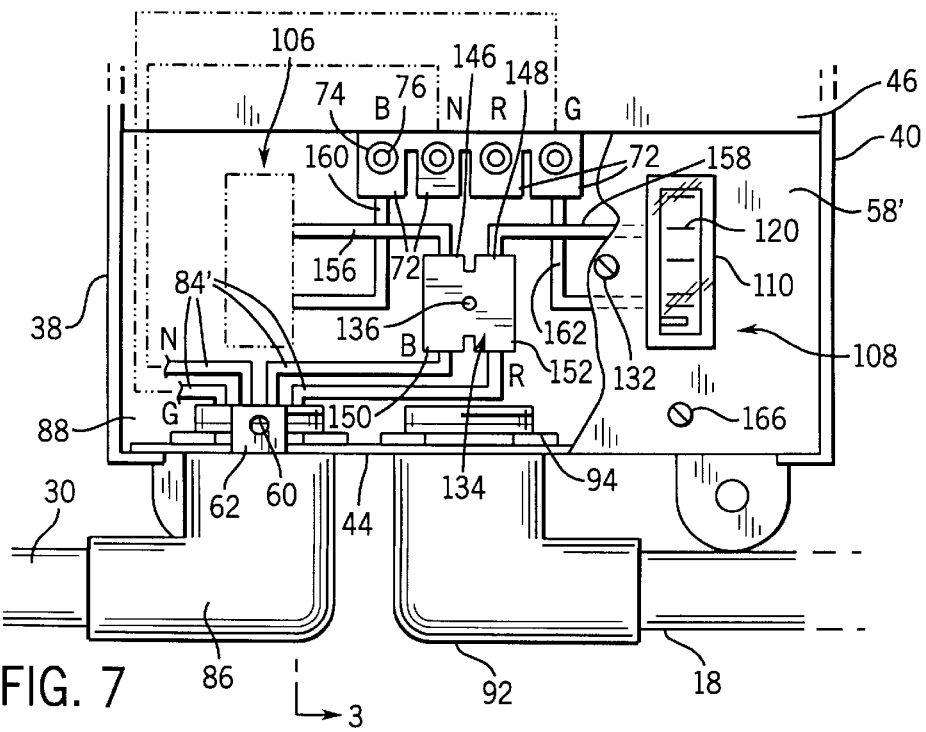
FIG. 7 is a view similar to FIG. 4 but showing a part of the access cover broken away to view the components in the bottom portion of the alternative power transfer arrangement.

FIGS. 4–7 disclose an alternative embodiment of the power transfer arrangement 16' having substantially identical components as previously described in FIGS. 1–3, except for removable access cover plate 58' and power input wires 84' (FIG. 7). In this power transfer arrangement 16', cover 58' has a rearwardly extending ledge 96 which is engageable beneath the transverse wall 54 of the front panel 46, and a vertically extending wall 98 which depends downwardly from ledge 96 and is engageable against cabinet side walls 38,40 and end wall 44. As seen in FIG. 5, ledge 96 includes a central recess 100 for accommodating the power input terminals defined by receiver 72 and cylindrical member 74. It should be appreciated that cover 58 also includes ledge 96, vertical wall 98, and central recess 100.

Cover 58' further includes a pair of openings 102,104 in alignment with openings 60 formed in the pair of tabs 62 projecting from bottom wall 44 to enable cover 58' to be secured to bottom wall 44 by threaded fasteners 64,66 which extend through the cover openings 102,104 and into threaded engagement with tab openings 60.

Cover 58' is provided with power input indicating structure in the form of a pair of spaced apart watt meters 106,108 which are connected to the power input terminal arrangement 68 and are selectively used to display the amount of power supplied by the generator 10 during a power outage. Each of the watt meters 106,108 has a convexly-shaped forward portion 110 integrally attached to a T block-shaped rear portion 112. Each forward portion 110 projects through a respective rectangular opening 114 formed in wall 98, and is attached to the inside of wall 98 by a pair of spring-biased retainers 116. Each forward portion 110 defines a transparent window having a convexly-shaped support member 118 for mounting a wattage scale 120 visible through the window, and an indicator 122 mounted for movement along the scale 120 in response to the supplying of generator power. Each rear portion 112 extends rearwardly and perpendicularly to wall 98 and is provided with a pair of upper and lower terminals 124,126, respectively, for connection with suitable wiring to be further explained below.

In order to facilitate connection of the watt meters 106, 108 to the power input terminal arrangement 68, the power input indicating structure also includes a one-piece, U-shaped attachment bracket 128 (FIG. 5) positioned on the inside of wall 98 between the watt meters 106,108. Bracket 128 is fastened by a pair of screws 131,132 which are passed through suitable unthreaded openings in wall 98, and received in suitably threaded openings in a flat base plate 130 of bracket 128. Base plate 130 serves as a support for an H-shaped terminal connector 134 which is removably fastened by a single screw 136 (FIG. 7) to a threaded grommet (not shown) retained in the base plate 130. Bracket 128 also has a pair of parallel side plates 138,140 which extend rearwardly from base plate 130, and serve as supports for a pair of wire guiding, cylindrical holders 142,144.

Terminal connector 134 has a structure similar to terminal assembly 68 and includes a pair of upwardly opening cylinder receivers 146,148 and a pair of downwardly opening cylinder receivers 150,152. Each receiver 146–152 has an inwardly extending cylindrical member 154 (FIG. 6) lying perpendicularly to receivers 146–152 and defining a passage for receiving a threaded member (not shown). As seen in FIG. 7, the ends of first and second input wires 84' designated B and R, respectively, are connected to the bottom receivers 150,152 in a manner as previously described in relation to terminal assembly 68. The third input wire 84' designated N is connected to receiver 72 designated N, and is further connected through conduit 18 to the neutral bar of load center 12. The fourth input wire 84' designated G is attached to receiver 72 designated G, and is also attached to the frame of transfer switch 16. A fifth wire 156 interconnects upper terminal 124 of watt meter 106 with upper receiver 146 of connector 134. A sixth wire 158 showing upper terminal 124 of watt meter 108 with the other upper receiver 148. A seventh wire 160 passes through holder 142 and connects the bottom terminal 126 of watt meter 106 with receiver 72 designated B. An eighth wire 162 passes through holder 144 and connects the bottom terminal 126 of watt meter 108 with receiver 72 designated R.

It can thus be appreciated that a manufacturer can provide either a hard-wired power transfer switching mechanism 16 or a meter-enhanced power transfer switching mechanism 16' simply by mounting either cover 58 or 58' to the cabinet over terminal compartment 56. With cover 58' in place, an operator is able to read the power being drawn on generator 10 so as to balance the loads and avoid overloading which can stall or slow the generator 10. The interchangeability of covers 58,58' provides significant efficiencies in manufacturing by providing a large number of common components for different models. It should also be understood that switch mechanism 16 and 16' can be retrofit in the field to provide desired cover 58,58'. In addition, it should also be appreciated that a socket-type power transfer switching mechanism 50' as disclosed in the aforementioned co-pending '257 application can also be provided by mounting cover 72' over terminal compartment 56 instead of cover 58 or 58'.

Various alternatives and embodiments are contemplated as being within the scope of the following claims particularly pointing out and distinctly claiming the subject matter regarded as the invention.

I claim:

1. In a power transfer device for supplying power from a generator to the electrical system of a building, the power transfer device being adapted for interconnection with the building electrical system, wherein the power transfer device includes external wall structure, the improvement comprising:

an outwardly open cavity extending inwardly from the external wall structure, wherein the cavity defines a terminal compartment;

a set of power input terminals located within the terminal compartment; and a removable cover selectively engageable with the power transfer device, wherein the removable cover is selectively placed over the cavity to selectively enclose the terminal compartment for preventing access to the set of power input terminals, wherein the cover includes power input indicating structure for connection to the set of power input terminals for selectively displaying the amount of power provided by the generator to the power transfer device.

2. The improvement of claim 1, wherein the power transfer device includes a cabinet defining the external wall structure, and wherein a set of switches is mounted to the external wall structure for controlling the supply of power from the power transfer device to the building electrical system, and wherein the set of switches are electrically connected to the set of power input terminals.

3. The improvement of claim 2, wherein the set of power input terminals are operable to establish a direct electrical connection between the power transfer device and a power inlet arrangement interconnected with the generator, and wherein the cavity defining the terminal compartment is at a location spaced from the set of switches.

4. The improvement of claim 3, wherein the cavity defines an opening providing access to the terminal compartment and wherein the cover is positionable over the opening and removably engageable with the cabinet for selectively closing the opening for preventing access to the terminal compartment.

5. The improvement of claim 4, wherein the opening providing access to the terminal compartment is defined in part by a rearwardly extending edge of a front panel forming a part of the external wall structure.

6. The improvement of claim 5, wherein the cover has a rearwardly extending ledge engageable with the rearwardly extending edge of the front panel, and a vertically extending wall depending from the ledge and engageable with an end wall forming a part of the external wall structure of the cabinet.

7. The improvement of claim 6, wherein the ledge is recessed to accommodate the set of power input terminals when the cover is in position covering the opening.

8. The improvement of claim 6, wherein the power input indicating structure is fixed to the vertically extending wall of the cover.

9. The improvement of claim 6, wherein the power input indicating structure includes at least one meter having a block-like rear portion and a convexly-shaped forward portion projecting through the vertically extending wall of the cover.

10. The improvement of claim 9, wherein the forward portion comprises a transparent window having a support member of mounting a wattage scale visible through the window, and an indicator mounted for movement along the scale in response to the supply of power from the generator.

11. The improvement of claim 9, wherein the power input indicating structure includes a pair of spaced apart meters.

12. The improvement of claim 11, wherein each of the meters is fixed to the vertically extending wall of the cover by a spring-biased clip.

13. The improvement of claim 3, wherein the power transfer device includes a set of power input wires extending between the power input indicating structure and the set of power input terminals.

14. The improvement of claim 13, wherein the power input indicating structure includes an attachment bracket positioned on the inner surface of a wall forming a part of the cover for facilitating connection of the meters to the power input terminals.

15. The improvement of claim 14, wherein the attachment bracket includes a base plate and one or more side plates extending rearwardly from the base plate.

16. The improvement of claim 15, further comprising a terminal connector fixed to the base plate, and a pair of wire-guiding holders fixed to the side plates.

17. In a power transfer device adapted for interconnection with the electrical system of a building and including a cabinet, a set of switches mounted to the cabinet, and a first set of wires for connecting the switches to an electrical distribution panel associated with the building electrical system, the improvement comprising:

an outwardly open cavity defined by the cabinet, wherein the cavity defines a terminal compartment;

a set of power input terminals located within the terminal compartment for interconnection with a source of auxiliary power;

a cover removably connected to the cabinet over the outwardly open cavity to selectively close the terminal compartment; and a meter arrangement mounted to the cover, wherein the meter arrangement is interconnected with the set of power input terminals and is operable to measure levels of power provided from a source of auxiliary power connected to the power input terminals.

18. The improvement of claim 17, further comprising a set of power input wires for interconnecting of the meter arrangement with the power input terminals.

19. The improvement of claim 17, wherein the power input terminals are connected to the switches by a second set of wires.

20. The improvement of claim 17, wherein the cabinet includes a set of tabs spaced along an end wall thereof, the tabs having apertures formed therein.

21. The improvement of claim 20, wherein the cover includes a set of openings alignable with the apertures in the tabs.

22. The improvement of claim 21, wherein a set of fasteners is passed through the openings in the cover and is threadably engageable with the apertures in the tabs.

23. A method for constructing a power transfer device for supplying power from a generator in electrical communication with a separate power inlet arrangement to the electrical system of a building the method comprising the steps of:

providing a cabinet having a compartment within which a power input terminal arrangement is located;

equipping the cabinet with a panel including a plurality of switches electrically connected to the power input terminal arrangement for controlling the supply of power from the power transfer device to the building electrical system;

providing a first cover member adapted for removable engagement with the cabinet over the compartment for selectively enclosing the power input terminal arrangement;

providing a second cover member having a power input meter arrangement and adapted for removable engagement with the cabinet over the compartment for selectively enclosing the power input terminal arrangement; and mounting either the first cover member or the second cover member to the cabinet over the compartment, and wherein the step of mounting the second cover member includes interconnecting the power input meter arrangement with the power input terminal arrangement.

* * * * *